United States Patent [11] 3,627,641

[72] Inventors Denise Mancy
Val-de-Marne;
Leon Ninet; Jean Preud'Homme, both of Paris, all of France
[21] Appl. No. 741,216
[22] Filed June 28, 1968
[45] Patented Dec. 14, 1971
[73] Assignee Rhone-Poulenc S.A.
Paris, France
[32] Priority June 30, 1967
[33] France
[31] 112713

[54] ANTIBIOTIC PRODUCTION UTILIZING STREPTOMYCES VENEZUELAE VAR. FULVOFURVESCENS
13 Claims, No Drawings

[52] U.S. Cl. ................................................... 195/80
[51] Int. Cl. ................................................... C12d 9/00
[50] Field of Search .......................................... 195/80

[56] References Cited
UNITED STATES PATENTS
2,483,892 10/1949 Ehrlich et al. ............... 195/80
2,916,483 12/1959 Dutcher et al. ............... 195/80 X
3,089,816 5/1963 Galumann et al. ............ 195/80 X FOREIGN PATENTS
1,057,424 2/1967 Great Britain ................ 195/80

Primary Examiner—Joseph M. Golian
Attorney—Stevens, Davis, Miller & Mosher

ABSTRACT: The invention provides a new process for producing the antibiotic 11837 by fermentation using two newly discovered strains of the micro-organism *Streptomyces venezuelae*, of which they constitute a variety which has been designated *var. fulvofurvescens*.

ANTIBIOTIC PRODUCTION UTILIZING STREPTOMYCES VENEZUELAE VAR. FULVOFURVESCENS

In our copending Pat. application Ser. No. 399,129 filed Sept. 16, 1964 (and in the corresponding British Pat. No. 1,057,424, published Feb. 1, 1967), we have described an antibiotic designated 11,837 R.P. This antibiotic is characterized therein by its solubility, elementary analysis, infrared spectrum and other properties and is shown to have antibacterial activity toward Gram-positive micro-organisms. The patent describes the preparation of the antibiotic by aerobically cultivating on an aqueous nutrient medium a micro-organism known as *Streptomyces viridans* DS 9466, which was deposited at the Northern Regional Research Laboratory at Peoria, Ill., U.S.A. under the reference number NRRL 3087.

We have now found that this antibiotic 11,837 R.P. or salts thereof with bases can also be prepared by the use of two newly discovered micro-organisms of the species *Streptomyces venezuelae*, of which they constitute a variety which has been given the name *Streptomyces venezuelae, fulvofurvescens* variety. These two micro-organisms will be designated respectively by the names "*S. venezuelae,* var. *fulvofurvescens* DS 7,103" (NRRL 3354) and "*S. venezuelae,* var. *fulvofurvescens* DS 11,355" (NRRL 3355).

The organism DS 7,103 was isolated from a soil specimen collected in Algiers, Algeria, and DS 11,355 from a specimen of soil collected in England in the Gloucester region. The methods of isolation were the same as described in the aforesaid patent and application.

All the following characteristics which the two micro-organisms exhibit are in fact in agreement with those of the species *S. venezuelae* described on the one hand in "The Actinomycetes," vol. 2 (S. A. WAKSMAN, The Williams and Wilkins Company, Baltimore, 1961), pages 280–281, and on the other hand in "Bergey's Manual of Determinative Bacteriology" (7th edition [1957], The Williams and Wilkins Company, Baltimore), pages 780–781: production of black melanic pigment on an appropriate medium containing tyrosine and production of blackish-brown soluble pigment on the majority of organic media, brownish-yellow to dark brown coloration of the vegetative mycelium on all of these cultures, pink color of the sporulated aerial mycelium, and organization of the sporiferous apparatus which consist in the production of straight or slightly flexuous, elongate sporophores.

They differ from the type-species *S. venezuelae* previously described in that they exhibit a number of differences in the sources of carbon which they are capable of utilizing for their development, do not yield chloramphenicol as antibiotic product but 11,837 R.P., and in particular produce an abundance of dark soluble pigment of orange-brown color, which rapidly becomes darker and darker and finally black, and which may color both the vegetative mycelium and the culture medium. *S. venezuelae* produces a rather similar pigment in some cases, but generally does so in a more moderate quantity and even fails to do so in some cases in which it is produced by the new micro-organisms (more particularly on certain synthetic media). This is why the latter have been called *Streptomyces venezuelae, fulvofurvescens* variety.

The cultural characteristics and the biochemical properties of *S. venezuelae,* var. *fulvofurvescens* DS 7,103 have been examined on a number of nutrient agars and nutrient broths generally used for examining Streptomyces strains. The collected results are shown in the following table I; except where otherwise indicated, they refer to cultures grown for 2 to 4 weeks at 26° C., when a good stage of development has been reached. Some of the culture media employed were prepared in accordance with the formulas indicated in the "The Actinomycetes," S. A. WAKSMAN, pp. 193–197, Chronica Botanica Company, Waltham, Mass., U.S.A., 1950; in this case, they are indicated by the letter W followed by the number accorded to them in "The Actinomycetes."

The references or compositions of the other culture media are as follows:

| | |
|---|---|
| Ref. | —K. L. JONES—Journal of Bacteriology, 57, p. 142 [1949]. |
| Ref. B | —Formula W-23 to which 2% of agar has been added. |
| Ref. c | —"Hickey and Tresner's Agar"—T. G. PRIDHAM et al.—Antibiotics Annual, 1956–1957, p. 950. |
| Ref. D | —"Yeast Extract Agar"—T. G. PRIDHAM et al.—Antibiotics Annual, 1956–1957, p. 950. |
| Ref. E | —"Tomato Paste Oatmeal Agar"—T. G. PRIDHAM et al.—Antibiotics Annual, 1956–1957, p. 950. |
| Ref. F | —The Actinomycetes, vol. 2, p. 333—No. 42—S. A. WAKSMAN—The Williams and Wilkins Company, Baltimore, 1961. |
| Ref. G | —W. E. GRUNDY et al.—Antibiotics and Chem. 2, 401, [1952]. |
| Ref. H | —"Inorganic Salts—Starch Agar"—T. G. PRIDHAM et al. Antibiotics Annual, 1956–1957, p. 951. |
| Ref. I | —corresponds to formula W-1, except that 30 g. of sucrose are replaced by 15 g. of glucose. |
| Ref. J | —corresponds to formula W-1, except that 30 g. of sucrose have been replaced by 15 g. of glycerine. |
| Ref. K | —"Plain gelatin"—prepared as directed in "Manual of Methods for Pure Culture Study of Baceteria," of the Society of American Bacteriologists, Geneva, N.Y., II$_{bc}$–18. |
| Ref. L | —corresponds to formula W-18, except that the sucrose is omitted and replaced by small strips of filter paper dipped partially in the liquid. |
| Ref. M | —H. D. TRESNER and F. DANGA—Journal of Bacteriology, 76, pp. 239–244 [1958]. |
| Ref. N | —Commercial powdered skimmed milk, reconstituted as instructed by the manufacturer. |

TABLE I

| Culture medium | Degree of development | Appearance of vegetative mycelium | Appearance of underside of the culture | Aerial system (total of aerial mycelium and sporulation) | Soluble pigment | Remarks and biochemical properties |
|---|---|---|---|---|---|---|
| Bennett's agar (Ref. A). | Good | | Very dark orange-brown to blackish-brown | Pale pink. Well developed. | Very dark orange-brown veering towards blackish-brown | Straight or slightly flexuous, fairly long sporophores. Cylindrical spores having rounded ends, measuring 0.3 to 0.5µ/0.8 to 1.24µ. |
| Emerson's agar (Ref. B). | do | Yellow-brown. Thick and folded, very well developed. | | Whitish, poorly developed. | do | |
| Hickey and Tresner agar (Ref. C). | Very good | | Blackish-brown | Pale pink. Very well developed. | Black | |
| Pridham's yeast extract agar (Ref. D). | do | | Black | do | do | |
| Pridham's oats and tomato agar (Ref. E). | do | | Very dark brown-yellow | do | Blackish-brown | |
| Glucose-peptone agar (W-7). | Fairly good | | Very dark almost blackish orange-brown | Greyish-white. Moderately developed. | Brown-black | |
| Nutrient agar (W-3). | Medium | Greyish yellow-brown. Fairly well developed. | | Nil | Yellow-brown | |
| Tyrosine-yeast extract agar for formation of melanine (Ref. F). | Fairly good | Black | Black | Pink to greyish-white. In the form of traces. | Deep black | Formation of melanine: positive after 48 hours of cultivation. |

TABLE 1—Continued

| Culture medium | Degree of development | Appearance of vegetative mycelium | Appearance of underside of the culture | Aerial system (total of aerial mycelium and sporulation) | Soluble pigment | Remarks and biochemical properties |
|---|---|---|---|---|---|---|
| Krainsky's calcium malate agar (Ref. G.) | do | | Pale brown-yellow | Pale pink. Average development. | Weak brownish-grey. | Solubilisation of the calcium malate: good. |
| Glucose-asparagine agar (W-2). | Good | | Black | Very pale pink. Moderately developed. | Blackish-brown | |
| Glycerine-asparagine agar (W-3). | do | | Orange-brown to black-brown. | Whitish to very pale pink. Moderately developed. | Very dark orange-brown, almost brown-black. | |
| Pridham's starch agar (Ref. H). | do | | Yellow-brown | Very pale pink. Well developed. | Weak brownish-grey. | Straight or slightyl flexuous, fairly long sporophores. Cylindrical spores having rounded ends, measuring 0.3 to 0.5 µ/0.8 to 1.24µ. Hydrolysis of the starch: positive |
| Czapek's synthetic sucrose agar. (W-1). | do | Thick, well developed. | Black | Grayish-white. Moderately developed. | Very dark orange-brown, almost black. | |
| Czapek's synthetic glucose agar (Ref. I). | do | do | Very dark orange-brown. | do | Very dark orange-brown. | |
| Czapek's synthetic glycerine agar (Ref. J). | do | Thick and folded, well developed. | Black. | do | Very dark orange-brown, almost black. | |
| Potatoe culture (W-27). | Very good | Black. Very thick and highly folded. | | Very pale greyish-pink, in the form of traces. | Black | |
| 12% pure gelatine (Ref. K). | Good | Good development on the surface. | Yellow-brown | Greyish-pink. Average development. | Orange-brown | Fairly rapid liquefaction of the gelatine. |
| Starch-nitrate broth (W-19). | do | Velum well developed. | Dark orange-brown | Whitish. Very moderately developed. | Orange-brown in small quantity starting from the surface. | Reduction of the nitrates to nitrites: positive. |
| Czapek's cellulose broth (Ref. L). | Moderate but positive. | | | Pink-white, on the paper emerging from the broth. | | Utilisation of the cellulose: positive. |
| Tresna and Danga's medium (Ref. M). | Good | Black | | Nil | Deep black. Abundant. | H₂S: positive production from 24 hours of cultivation. |
| Skimmed milk (Ref. N). | do | Well developed ring. Dark maroon. | | Nil | Very dark brown, almost blackish. | Peptonisation starting at the end of 2 weeks, almost complete in 1 month. No coagulation. pH changes from 6.3 to 7.0 in 1 month. |

*S. venezuelae*, var. *fulvofurvescens*, DS 11,355, has similar characteristics to *S. venezuelae*, var. *fulvofurvescens*, DS 7,103 on the media referred to in the foregoing table I. The only appreciable difference hitherto observed in the behavior of these two strains resides in their capacity to utilize certain sources of carbon or nitrogen; strain DS 11,355 does not utilize adonitol, which is utilized by strain DS 7,103, but does utilize sarcosine, which is not utilized by strain DS 7,103.

The capacity of the two strains to utilize various sources of carbon and nitrogen for their development has been determined in accordance with the principle of the method of Pridham and Gottlieb (J. of Bact. 56, pp. 107–114[1948]); the degree of development was observed on the basic medium described by these authors by replacing either glucose by the various sources of carbon tested, or $(NH_4)_2SO_4$ by the various sources of nitrogen tested. The results are indicated in the following table II:

The process according to the invention for preparing the antibiotic 11,837 R.P. consists in cultivating *Streptomyces venezuelae*, var. *fulvofurvescens* DS 7,103 or *Streptomyces venezuelae*, var. *fulvofurvescens* DS 11,355 on an aqueous nutrient medium containing assimilable sources of carbon, nitrogen and inorganic substances, and separating the 11,837 R.P. formed during the cultivation.

The general conditions under which the cultivation of "*Streptomyces venezuelae*, var. *fulvofurvescens* DS 7,103" and of "*Streptomyces venezuelae*, var. *fulvofurvescens* DS 11,355" takes place for the production of the antibiotic 11,837 R.P., and the methods of isolating this antibiotic from fermentation molds are identical to those described in the aforesaid patent for the preparation of 11,837 R.P. from "*Streptomyces viridans*" DS 9,466" (NRRL 3,087).

The culture is preferably effected under submerged aerobic culture conditions commencing at a pH between 6.0 and 7.8,

TABLE II

| Sources of carbon tested | Utilisation by the strains | | Sources of nitrogen tested | Utilisation by the strains | |
|---|---|---|---|---|---|
| | DS 7,103 | DS 11,355 | | DS 7,103 | DS 11,355 |
| d-Ribose | + | + | NaNO₃ | + | + |
| d-Xylose | + | + | NaNO₂ | + | + |
| l-Arabinose | + | + | (NH₄)₂SO₄ | + | + |
| l-Rhamnose | + | + | (NH₄)₂HPO₄ | + | + |
| d-Glucose | + | + | Adenine | + | + |
| d-Galactose | + | + | Adenosin | + | + |
| d-Fructose | + | + | Uracil | − | − |
| d-Mannose | + | + | Urea | − | − |
| l-Sorbose | − | − | l-Asparagine | + | + |
| Lactose | + | + | Glycocoll | + | + |
| Maltose | + | + | Sarcosin | − | + |
| Sucrose | + | + | dl-Alanine | + | + |

TABLE II—Continued

| Sources of carbon tested | Utilisation by the strains | | Sources of nitrogen tested | Utilisation by the strains | |
|---|---|---|---|---|---|
| | DS 7,103 | DS 11,355 | | DS 7,103 | DS 11,355 |
| Trehalose | + | + | dl-Valine | + | + |
| Cellobiose | + | + | dl-Aspartic acid | + | + |
| Raffinose | + | + | l-Glutamic acid | + | + |
| Dextrin | + | + | l-Arginine | + | + |
| Inulin | − | − | l-Lysine | + | + |
| Starch | + | + | dl-Threonine | + | + |
| Glycogen | + | + | dl-Methionine | − | − |
| Glycerol | + | + | Taurine | − | − |
| Erythritol | − | − | dl-phenylalanine | + | + |
| Adonitol | + | − | l-Tyrosine | + | + |
| Dulcitol | − | − | dl-Proline | + | + |
| d-Mannitol | + | + | l-Hydroxproline | + | + |
| d-Sorbitol | − | − | l-Histidine | + | + |
| Inositol | + | + | l-Tryptophane | + | + | preferably between 6.5 and 7.5 and at a temperature from 23° to 35° C. preferably 25° to 28° C. with an aeration rate of 0.3 to 2 liters of air per liter of medium per minute for from 4 to 7 days.

The antibiotic may be separated from the culture medium by adjusting the pH of the medium to below 5, filtering and extracting the filter cake with water containing a lower alcohol (of up to six carbon atoms) at a pH of 3 to 7, or with a mixture of lower alcohols. Alternatively, it may be separated by adjusting the pH of the medium to about 7 and absorbing the antibiotic on to a strongly basic anion exchange resin from which it is eluted with an aqueous alcoholic solution containing an electrolyte.

The crude product may be concentrated and purified by the methods described in the aforesaid patent and application and, in particular, may be purified by chromatography.

The antibiotic 11,837 R.P. produced by the strains DS 7,103 and DS 11,355 is a mixture, the nature of the constituents of which is identical to that of the constituents of the antibiotic 11,837 R.P. produced by the strain DS 9,466 (which is actually also a mixture of a number of constituents having very similar biological and physicochemical properties); only the relative proportions of the constituents to one another may vary from one strain to the other, or even in the same strain from one batch of product to the other.

The constituents of the mixtures may be identified by the conventional methods of analyzing antibiotic mixtures, for example by paper and thin-layer chromatography and by electrophoresis, followed by microbiological development, for example by application to inoculated agar plates.

The infrared spectra of the products obtained by cultivation of the new strains, although not absolutely identical with the spectra shown in the aforesaid patent, have substantially the same absorption bands merely with a few differences in relative intensity which result from the variable proportions of the constituents in relation to one another.

The following examples illustrate the invention. In the following, the activity is measured biologically by the diffusion method, using *Bacillus subtilis* as the sensitive micro-organism and with reference to a specimen of pure 11,837 R.P. taken as standard. This activity is expressed in units (u) per mg. for the solid products and in units per cc. for the solutions (a "unit" is defined as the minimum quantity of product which, dissolved in 1 cc. of the appropriate culture medium, inhibits the growth of *Staphylococcus aureus* 209 P under specified conditions).

EXAMPLE 1

A 170-liter fermentation vessel is charged with:

| | |
|---|---|
| corn steep | 4.8 kg. |
| glucose hydrate | 2.4 kg. |
| sodium chloride | 0.6 kg. |
| magnesium sulfate | 0.12 kg. |
| water, to make | 110 litres |

When the pH of the mixture has been adjusted to 7.30 by adding 535 cc. of sodium hydroxide solution ($d$=1.33), 0.6 kg. of calcium carbonate are added.

The nutrient medium is then sterilized by bubbling steam at 122° C. through it for 40 minutes. After cooling, the broth has a volume of 120 liters and the pH is 6.90. The medium is inoculated with 200 ml. of a culture, grown in an agitated Erlenmeyer flask, of the strain *Streptomyces venezuelae* var. *fulvofurvescens* DS 7,103. The culture is developed at 30° C. for 28 hours with stirring and aeration with sterile air, whereupon it is ready for inoculation of the production culture.

The production culture is carried out in an 800-liter fermentation vessel charged with the following substances:

| | |
|---|---|
| corn steep | 20 kg. |
| starch | 7.500 kg. |
| soya bean oil | 7.500 liters |
| monopotassium phosphate | 1 kg. |
| magnesium sulfate | 1 kg. |
| cobalt chloride hexahydrate | 0.010 kg. |
| water, to make | 460 liters |

When the pH of the mixture has been adjusted to 7.15 with 2,800 ml. of concentrated sodium hydroxide ($d$=1.33), there is added 5 kg. of calcium carbonate.

The culture medium at pH 7.35 is sterilized by bubbling steam at 122° C. through it for 40 minutes. After cooling, the broth has a volume of 490 liters and its pH is 7.05. The product is then inoculated with 50 liters of the above-described inoculum culture in a 170-liter fermentation vessel. The cultivation is performed at 30° C. for 96 hours with stirring with the aid of a turbine rotating at 285 r.p.m. and with aeration with a flow of sterile air of 25 cub. m./h. The pH of the medium is then 8.55 and the volume of the medium is 420 liters. The quantity of antibiotic present is 1820 u/cc.

EXAMPLE 2

Four hundred twenty liters of culture medium of *Streptomyces venezuelae*, var. *fulvofurvescens* DS 7,103, prepared as described in example 1, are adjusted to a pH value of 4 by means of phosphoric acid in an agitated tank. After agitation for half an hour, 20 kg. of Clarcel DIC are added to the medium and the suspension is passed to a filter press. After filtration, the mycelial cake is washed on a filter with 200 liters of water. The combined filtrate and washings (total volume 550 liters) are discarded. The wet cake, which weighs 113 kg., is suspended in a mixture of 250 liters of methanol and 50 liters of water in a tank with agitation. The pH of the suspension is adjusted to 7 by means of sodium hydroxide ($d$=1.33) and the agitation is continued for 1 hour. After this period, the suspension is passed to a filter press and the cake is washed with 50 liters of methanol containing 30 percent of water.

The extracted mycelium, which weighs 96 kg., is discarded. The methanol extract of the mycelium (total volume 360 liters) is concentrated under reduced pressure (40 mm. Hg) in a continuous recycling apparatus to a volume of 6 liters. The concentrate is then precipitated by means of a mixture of 30 liters of ethanol and 40 liters of acetone.

The precipitate is separated, washed and dried in an oven in vacuo and there are thus obtained 780 g. of a product containing 515 u/mg.

EXAMPLE 3

Seven hundred eighty grams of the antibiotic prepared as described in example 2, containing 515 u/mg., are dissolved in 10 liters of distilled water.

The solution is filtered through a bed of fossil silica and then passed through a column (internal diameter 9 cm.) containing 6 liters of Dowex 1-X2 resin (chloride form). ["Dowex" is a registered trademark]. The column is washed successively with:

| | |
|---|---|
| distilled water, until the effluent is colorless | 6 liters |
| formic acid-water mixture (10-90 by volume) | 20 liters |
| formic acid-water-methanol mixture (10-10-80 by volume) | 20 liters |
| methanol-water mixture (80-20 by volume) | 20 liters |

The antibiotic is then eluted by a methanol-water mixture (80-20 by volume) to which 10 g./l. of potassium chloride have been added.

Ten-liter fractions are collected; the most active fractions (two to six) are recombined and concentrated under reduced pressure at a temperature below 40° C. until a final volume of 3 liters is obtained.

The concentrate is dialyzed for 48 hours against 40 liters of distilled water renewed three times through a regenerated cellulose membrane to eliminate the mineral salts and low molecular weight organic impurities, and then freeze-dried.

There are thus obtained 27 g. of purified antibiotic in the form of its potassium salt, containing 12,300 u/mg. and having the following physicochemical characteristics:

appearance: readily water-soluble beige-pink amorphous powder ultraviolet spectrum: determination from a 50 mg./l. solution in water: a maximum absorption at 255 nm. ($E_{1\ cm.}^{1\%}$ =106.5)

its elementary composition is:
C%=46.9   H%=6.65   O%=36.9 (by difference)
N%=4.5    P%=2.1    K%=2.95

EXAMPLE 4

An inoculum culture medium is prepared as described in example 1 in a 170-liter fermentation vessel. The medium, whose pH value after sterilization is 7.0, is inoculated with 200 ml. of an agitated Erlenmeyer culture of the strain *Streptomyces venezuelae* var. *fulvofurvescens* DS 11,355. The culture is developed for 30 hours under the agitation, aeration and temperature conditions described in example 1.

The production culture is carried out in a 800-liter fermentation vessel charged with 500 liters of the medium described in example 1. This medium, whose pH after sterilization is 6.90, is inoculated with 50 liters of the inoculum culture in a 170-liter fermentation vessel as described above. After cultivation for 99 hours, under the agitation, aeration and temperature conditions employed for the culture of example 1, the pH value of the medium is 8.45 and the volume of the medium is 495 liters. The quantity of the antibiotic present is 1520 u/ml.

EXAMPLE 5

Four hundred ninety-five liters of culture medium of *Streptomyces venezuelae* var. *fulvofurvescens* DS 11,355 prepared as described in example 4 are treated as described in example 2.

There are obtained 480 g. of crude antibiotic containing 1000 u/mg. Four hundred and seventy grams of the crude antibiotic prepared as described in example 5 and containing 1000 u/mg. are treated as in example 3.

There are then obtained 14.6 g. of purified antibiotic in the form of its potassium salt, containing 19,400 u/mg. and having the following physicochemical characteristics:

appearance: readily water-soluble whitish amorphous powder.

ultraviolet spectrum: determination from a 50 mg./l. solution in water: a maximum absorption at 256 nm. ($E_{1\ cm.}^{1\%}$ =120)

its elementary composition is:
C%=46.4   H%=6.35   N%=4.1   P%=2.3   K%=6.9

O%=33.95 (by difference).

The invention also includes within its scope pharmaceutical compositions containing 11,837 R.P. as such or as nontoxic salt thereof, when prepared by the processes disclosed herein, in conjunction with a compatible pharmaceutically acceptable carrier; details of the form of such compositions are given in our aforesaid patent and application and in the following example.

EXAMPLE 7

A solution is prepared which contains 50 g. of the potassium salt of 11,837 R.P. prepared by the method of example 6 in distilled water to make 500 cc. This solution is sterilized by filtration through a bacteriostatic filter and then charged into ampuls (5 cc. per ampul). The solution in the ampuls is then freeze-dried and the ampuls are sealed. For parenteral administration, the content of the ampuls are dissolved immediately before use in 5 cc. of distilled water to make an injectable solution. In this manner, there are obtained about 5 cc. of solution containing 0.5 g. of the antibiotic.

A subculture of *Streptomyces venezuelae* var. *fulvofurvescens* (NRRL 3345 or 3355) can be obtained from the permanent collection of the Northern Utilization Research and Development Collection of the Northern Utilization Research and Development Division, Agricultural Research Service, U.S. Dept. of Agriculture, Peoria, Ill., U.S.A., by anyone referring to this patent publication.

We claim:

1. Process for the production of the antibiotic 11,837 R.P. which comprises aerobically cultivating an organism selected from the group *Streptomyces venezuelae*, var. *fulvofurvescens* DS 7,103 (NRRL 3354) and *Streptomyces venezuelae*, var. *fulvofurvescens* DS 11,355 (NRRL 3355) on an aqueous nutrient medium containing assimilable sources of carbon, nitrogen and inorganic substances, and separating the 11,837 R.P. formed during the cultivation.

2. Process according to claim 1, wherein the culture is effected under submerged aerobic culture conditions at a pH between 6.0 and 7.8 and at a temperature from 23° to 35° C. with an aeration rate of 0.3 to 2 liters of air per liter of medium per minute for from 4 to 7 days.

3. Process according to claim 2, wherein the pH of the nutrient medium at the beginning of the culture is between 6.5 and 7.5.

4. Process according to claim 2, wherein the temperature of the culture is 25° to 28° C.

5. Process according to claim 2, wherein the 11,837 R.P. is separated from the culture medium by adjusting the pH of the medium to below 5, filtering and extracting the filter cake with water containing a lower alcohol at a pH of 3 to 7.

6. Process according to claim 2, wherein the 11,837 R.P. is separated from the culture medium by adjusting the pH of the medium to below 5, filtering and extracting the filter cake with a mixture of lower alcohols.

7. Process according to claim 2, wherein the 11,837 R.P. is separated from the culture medium by adjusting the pH of the medium to about 7 and absorbing the antibiotic on to a strongly basic anion exchange resin from which it is eluted with an aqueous alcoholic solution containing an electrolyte.

8. Process according to claim 5, wherein the crude antibiotic is purified by chromatography on a strongly basic anion exchange resin.

9. Process according to claim 6, wherein the crude antibiotic is purified by chromatography on a strongly basic anion exchange resin.

10. Process according to claim 7, wherein the crude antibiotic is purified by chromatography on a strongly basic anion exchange resin.

11. Process according to claim 8, wherein the partially purified antibiotic obtained is further purified by dialysis of an aqueous solution thereof.

12. Process according to claim 9, wherein the partially purified antibiotic obtained is further purified by dialysis of an aqueous solution thereof.

13. Process according to claim 10, wherein the partially purified antibiotic obtained is further purified by dialysis of an aqueous solution thereof.

* * * * *